Nov. 26, 1968  A. COCHARDT  3,412,461

METHOD FOR MAKING FERRITE MAGNETS

Filed Dec. 9, 1963

WITNESSES
Theodore F. Wrobel
James F. Young

INVENTOR
Alexander W. Cochardt
BY
Frederick Shoyer
ATTORNEY

United States Patent Office 3,412,461
Patented Nov. 26, 1968

3,412,461
METHOD FOR MAKING FERRITE MAGNETS
Alexander Cochardt, Franklin Township, Westmoreland County, Pa., assignor to Westinghouse Electric Corporation, Pittsburgh, Pa., a corporation of Pennsylvania
Filed Dec. 9, 1963, Ser. No. 328,912
Claims priority, application Germany, Dec. 11, 1962, C 28,629
18 Claims. (Cl. 29—608)

This invention relates to a novel method for making a plurality of ferrite magnets having improved magnetic properties.

As is now well known there exists a group of ferromagnetic materials having a hexagonal crystal lattice structure which is known as the "magnetoplumbite" structure. Among these ferromagnetic materials the most important commercially is barium ferrite having the chemical formula $BaFe_{12}O_{19}$, but strontium ferrite ($SrFe_{12}O_{19}$) and lead ferrite ($PbFe_{12}O_{19}$) are also known. The properties of the magnetoplumbites have been widely investigated and their characteristics and methods for their manufacture have been disclosed in numerous patents and other publications.

In my copending application Ser. No. 102,190, filed Apr. 11, 1961, now Patent No. 3,113,927, there is disclosed a modified strontium ferrite magnetic material displaying excellent magnetic properties which is composed of relatively impure and inexpensive raw materials, but nevertheless is superior in magnetic properties to strontium ferrite magnets made from high purity materials. The sintered magnet body disclosed therein is composed of a crystalline material consisting of, by weight, from 7% to 18% of SrO, from 0.1% to 2% of $SrO_4$, up to 1% of BaO, up to 1% of CaO, up to 1% of a compound selected from the group consisting of $CaSO_4$, $BaSO_4$, and $Na_2O$, up to 2% of at least one of the compounds selected from the group consisting of $SiO_2$ and $Al_2O_3$, and the balance being $Fe_2O_3$.

The anisotropic oxide permanent magnets are made employing generally well known ceramic processes but including a step during which the oxide crystals of the material are preferentially aligned in a predetermined direction. In brief outline the process for making the magnets usually includes the following steps: the raw materials comprising oxides or salts that decompose on heating to form oxides, are intimately mixed together; the mixture is calcined at a temperature between 900° C. and 1300° C.; the calcined mass is pulverized and milled in slurry form for a period of hours until a particle size smaller than about 20 microns is obtained; the milled slurry is then pressed into the desired magnet shape in the presence of a magnetic field which aligns the ferrite particles so that the magnets become anisotropic and, simultaneously, a large proportion of the liquid in the slurry is removed; the pressed green magnets are then fired at a temperature between 1000° C. and 1300° C., and the sintered magnets are thereafter ground to size, if necessary, and are then magnetized.

The step of orienting the magnetic particles is of great importance since it is found that the maximum energy product $(BH)_{max}$ of the oriented ferrite magnet is about four times that of the unoriented magnet. Thus, the maximum energy product of the anisotropic modified strontium ferrite described in the above-mentioned application Ser. No. 102,190 is of the order of 4 m.g.o. (mega gauss × oersteds) compared to only about 1 m.g.o. for the isotropic grade.

While beneficial in most respects the orienting of the ferrite crystals has caused has caused certain problems in the manufacture of the magnets. When green ferrite magnets are fired it is found that shrinkage occurs in varying degree in different directions within the magnet. For example, in an anisotropic strontium ferrite magnet shrinkage amounts to about 35% in the direction of orientation and only about 10% perpendicular to the direction of orientation. The isotropic magnet on the other hand sustains shrinkage only about 18% in all directions. It will be understood that in an anisotropic magnet any misalignment of crystals in any part of the magnet will affect the magnitudes of shrinkage in the nominal direction of orientation and perpendicular to the nominal direction of orientation. Since the material is inherently brittle, the non-uniform shrinkage in different directions may cause the anisotropic ferrite magnets to crack during firing. Even if the magnets do not crack, warpage and distortion often occur during the firing so that expensive grinding operations are required to make the surfaces of the magnets flat. This undesirable misalignment of ferrite crystals may result from a variety of phenomena including "fringing" of the orienting magnetic field, turbulence of the fluid as it is being expressed during pressing, and die friction, since the die walls move with respect to the green compact during pressing.

The "fringing" effect is the result of the fact that the magnetic lines of force are curved at the edges of the orienting magnetic field although they may be quite straight at the center of the magnetic field. Accordingly, the material at the edge of the green compact will have the crystals thereof aligned with the curved magnetic lines of force, and thus these crystals will not be aligned parallel to the crystals in the center of the compact.

The turbulence effect is the result of the rapid expression of water during pressing since the velocity of the water fluid may tilt or tip particles away from alignment with the magnetic lines of force.

The die wall friction effect is fairly obvious in that since the die wall moves in contact with the green compact, the crystal particles may be forced out of alignment with the magnetic lines of force.

These various effects are particularly noticeable where the magnets produced are relatively small in size; that is, where the smallest dimension of the cross section of the magnet perpendicular to the direction of orientation is less than five times the thickness of the green magnet in a direction parallel to the direction of orientation.

It is the primary object of this invention to provide a method for producing a plurality of anisotropic permanent magnet bodies from a single large oriented green ferrite plate-like body whereby the individual magnets are relatively crack-free and have a superior magnetic energy product and superior mechanical properties.

It is another object of this invention to provide a method for producing a plurality of anisotropic permanent magnet bodies wherein the orienting step is carried out on a unitary relatively flat mass whereby the power required per magnet to establish the orienting field is substantially reduced.

It is a further object of this invention to produce a magnet having improved magnetic properties and in particular an improved energy product by employing only the central area of the ferrite magnet plate having the best magnetic properties.

Another object of the invention is to produce improved anisotropic ferrite magnets by subjecting a quantity of finely divided ferrite material to pressing to form a relatively flat compact while subjecting the ferrite material to a strong magnetic field having its lines of force substantially parallel and straight in a direction perpendicular to the face of the flat compact whereby to orient the ferrite particles.

Other objects of the invention will, in part, be obvious and will, in part, appear hereinafter. For a better understanding of the nature and objects of this invention, reference should be had to the following detailed description and drawings, in which.

This invention is particularly directed to a process for making a plurality of ferrite permanent magnets having sintered bodies composed of crystalline material with a magnetoplumbite structure, and the process involves forming a large, relatively flat body of oriented material from finely divided ferrite material in which the smallest dimension of the cross section of said ferrite body perpendicular to the direction of orientation is at least five times, but preferably at least ten times, the average thickness of the body, and subjecting the body to a strong magnetic field during the forming process, subdividing the body into the desired plurality of bodies having shapes generally corresponding to that of the desired magnets, sintering the magnet bodies and thereafter magnetizing said fully sintered bodies.

Stated in another way the pressed and oriented ferrite plate has its major dimensions in a plane perpendicular to the pressing direction and its thickness is parallel to the pressing direction, while the smallest major dimension of said ferrite plate is at least five times, or preferably ten times, the average thickness of said plate.

The term "major dimension" as employed in this specification means any straight line dimension which passes generally through the center of the oriented ferrite plate and intersects opposite edges of said plate in the plane perpendicular to the direction of orientation.

Figure 1:
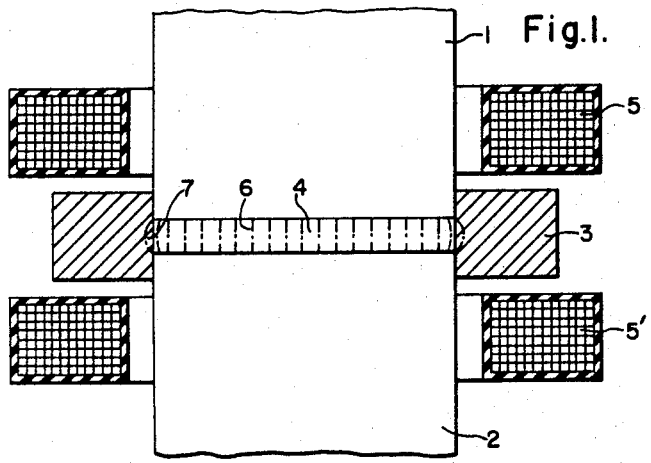
FIGURE 1 is a schematic diagram, partially in cross section, of portions of a pressing and orienting apparatus arranged for making the magnets of this invention.

Referring to FIG. 1 there is shown apparatus suitable for the production of a green ferrite magnet compact having a high ratio of lateral dimensions to thickness in accordance with this invention. Thus, an upper press member 1 and a lower press member 2 are shown which, with the die wall 3, define a cavity 4 for containing a ferrite slurry in the process of the invention. Two coils 5 and 5' are shown in part in cross section. These coils have the function of establishing the orienting magnetic field, the lines of force of which are shown schematically in the cavity at 6. It will be noted that the lines of force are generally straight in the inner portions of the die cavity and are curved only at the edges of the cavity as at 7. Accordingly, the ferrite particles are all oriented strongly and uniformly in parallelism at all portions of the body except near the edges.

Figure 2:
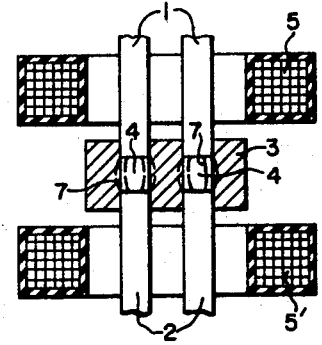
FIG. 2 is a cross section of a schematic representation of apparatus arranged in accordance with the prior art for making magnets of the type in which this invention is concerned.

In contrast, FIG. 2 shows the method employed in the prior art in producing a plurality of relatively small ferrite magnets, i.e., the thickness approaches that of the lateral dimensions. In the figure, a plurality of upper press members 1 are opposed to a plurality of lower press members 2. While only two sets of press members are shown it should be evident that many press members might be attached to a single pressing head. In FIG. 2 the numerals refer to the same elements as in FIG. 1. It will be noted that the lines of force 7 indicate that a relatively large proportion of the magnetic lines of force in each die cavity 4 are curved rather than straight. Accordingly, the majority of the ferrite crystals are not oriented parallel to each other.

Figure 3:
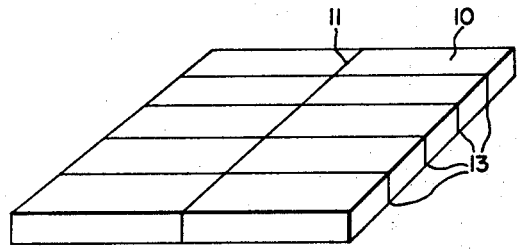
FIG. 3 shows a green pressed oriented ferrite plate with the individual magnets indicated thereon.

The process for making the magnets of the invention will be described with particular reference to FIGS. 1 and 3. In operation the punch member 2 is raised to operative position and the punch member 1 is lowered into the die member 3 to form the cavity 4 into which a ferrite slurry is pumped through means not shown. The punch member 1 and the die member 3 are then moved downwardly pressing the slurry in the cavity 4 and expressing and disposing of the fluid constituent of the slurry through means not shown. Simultaneously with the pressing action the coils 5 and 5' are energized producing the magnetic field indicated at 6 and 7 which operates to orient the ferrite particles. Following the orientation operation the punch member 1 is raised and the die member 3 is lowered exposing the ferrite plate. The plate may then be removed from punch member 2. A green pressed and oriented ferrite plate 10 is illustrated in FIG. 3. The pressing direction and direction of orientation of the green plate are parallel to each other and perpendicular to the broad flat top surface of the plate seen in FIG. 3. The green ferrite plate 10 of FIG. 3 may then be sub-divided, for example by cutting as with a diamond cutting wheel, along the lines 11 and 13 of FIG. 3.

While only rectangular magnets are indicated in FIG. 3 it will be understood that other shapes including rod, disk and ring-shaped magnets may be cut out of the plate.

After pressing, and before removal of the ferrite plate from the die the plates are demagnetized as far as possible in order to simplify the cutting of the desired magnetic pieces. Cutting with diamond or silicon carbide wheels, ultrasonic caviation with cutters using abrasives or other means may be employed, including drilling and machining.

Sub-dividing the large ferrite plate in the green condition (pressed and demagnetized, but not sintered) is the preferred method of operation since the green ferrite plates are relatively easy to divide or cut. This is especially true when binding, lubricating and plasticizing media common in the ceramic industry are added to the mass of powder undergoing the pressing operation. However, a certain amount of crumbling at the edges may be sustained during cutting when the magnets are in the unsintered condition. Cleaner cutting (but with considerably more cutting effort) is obtained by partially sintering the green ferrite plates prior to the cutting operation. Partial sintering may also be necessary when very thin magnets are being made. Such partial sintering can be obtained for the preferred ferrite compositions in a range of perhaps 800° C. to 1000° C. for up to about three hours and then cooling. Any degree of partial sintering can be employed.

The partial sintering improves the mechanical strength of the magnet ferrite plates. In such cases, it is also unnecessary to demagnetize the ferrite plates after pressing because the partial sintering effectively demagnetizes the plates. Partial sintering is best accomplished at a temperature from about 200° C. to 300° C. below the final sintering temperature. In the case of strontium and also in barium ferrite magnets, the preferred partial sintering temperature is, as has been previously stated, from about 800° C. to about 1000° C. Partial sintering of the pressed compacts can also be effected at higher temperatures for very short periods.

In some cases it may be desirable to fully sinter the ferrite plate prior to cutting and in that case temperatures of about 1250° C. are employed.

While the ferrite powder may be compacted in the dry condition it is generally more satisfactory to employ a slurry. Preferably the principal fluid ingredient of such a slurry is water and the fluid may include one or two percent of a dispersing agent, such as sodium naphthalene sulfate or polyvinylpyrrolidone. Alcohols or other fluid suspending media can be employed.

As an additional benefit, it has been found that the power requirements for the magnetic field for the single ferrite plate of the present invention are far less per magnet produced than would be the case if each magnet were separately made in accordance with the prior art.

The electric power P required to produce the required field of about 4000 oe. is proportional to the square of the magnetic resistance $R_m$ of the magnetic gap in the magnetic circuit of the press, up to a certain value of $R_m$. Thus, to a close approximation, $$P \sim (R_m)^2 = (Lg/Ag)^2$$

where $Lg$ is the length of the magnetic gap, and $Ag$ the area of the pole faces. FIG. 1 illustrates the situation at the end of the pressing process. The magnetic gap $Lg$ is equal to the mechanical gap or to the thickness $t$ of the magnet plate, because press members 1 and 2 are made from magnetically soft steel.

Tests have shown that in the arrangement disclosed in FIG. 2 the magnetic field lines 4 run straight and substantially parallel and lie within an angular range of 2° throughout the entire volume of the ring-shaped magnet core during the pressing operation when, on placing non-magnetic spacers on the plungers 1 and 2, the magnetic gap at the end of the pressing process is about seven times as large as the mechanical gap. Thus, in the case of the arrangement shown in FIG. 2, in order to produce magnet cores having exceptional properties, the following approximate relationship should hold, namely $Lg=7t$. The electrical power required in this arrangement to press a single larger ring-shaped magnet core, or to press several smaller magnet cores, is enormously high. In contradistinction to this, the electrical power required in the arrangement in accord with the present invention is relatively small for the same field strength since the magnetic gap need be no larger than the mechanical gap when the smallest dimension of the cross section of the magnetic field is at least five times the thickness. From this comparison, the large savings in power accomplished by the process of the invention will be appreciated.

In order that the invention may be more clearly understood, a number of examples of the practice of the invention are now offered.

In Example I, part A, the practice of the prior art is set forth so that the quality of the magnets produced thereby may be compared with the quality of magnets produced by the practice of the present invention as described in part B of Example I and in some of the succeeding examples a similar comparison is made.

EXAMPLE I

Figure 4:
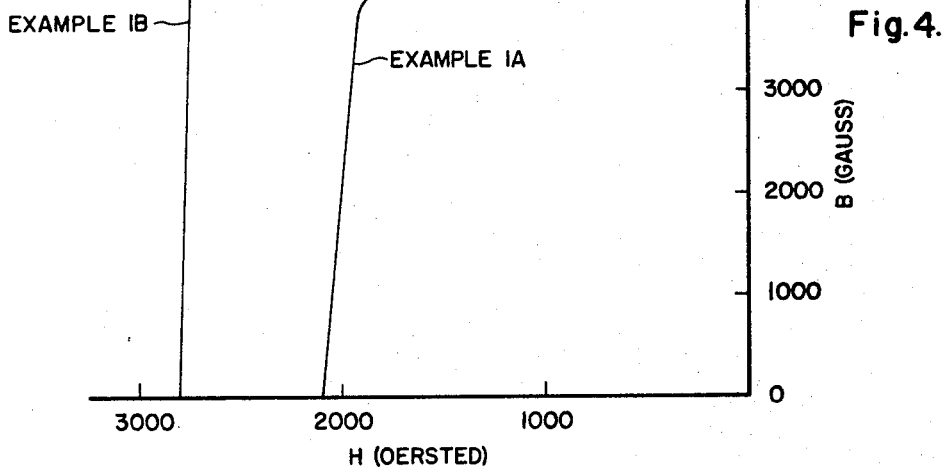
FIG. 4 shows the hysteresis curves of ring-shaped magnets produced by the method of this invention compared with similar magnets made by conventional techniques.

A 14.2% by weight of a complex strontium carbonate obtained from the mineral celestite by a reduction, solution and precipitation process, as described in the above-mentioned copending application Ser. No. 102,190 were mixed in the wet condition for four hours in a ball mill with 0.5% by weight of calcium fluoride $CaF_2$ and 85.3% by weight of iron oxide $Fe_2O_3$. The slurry was dried in an oven by evaporating the water. The dried cake was presintered for one hour at 1250° C. The presintered clinker was broken up and wet-milled for 45 hours in a ball mill. Green ring-shaped magnet cores were then pressed from the milled material in a magnetic field using the arrangement shown in FIG. 2, the field strength being 4000 oersted at the mid-point of the pressing volume. The dimensions of the pressed green ring were as follows: a thickness of 0.5 cm., an outside diameter of 0.8 cm. and an inside diameter of 0.4 cm. The ratio of the maximum diameter to the thickness=1.6, but the ratio of the ring wall to the thickness is 0.4. The water cooled coil used to obtain the required magnetic field of 4000 oersted required a power of 480 watts during the pressing. As shown in FIG. 2, the lines of magnetic force 4 between the upper plunger 1 and the lower plunger 2 are curved within the cavity. After drying, the pressed green ring-shaped magnet cores were heated at an average rate of 165° C. per hour to 1240° C. and held at this temperature for 15 minutes. On cooling to room temperature, the fired magnets had a thickness of 0.38 cm., an outside diameter of 0.72 cm., and an inside diameter of 0.36 cm. The hysteresis loop of the magnets was determined. FIG. 4 shows the second quadrant of an average magnet. The remanence was $Br=4200$ gauss, the coercive force $_IH_c=2100$ oersted, and the maximum energy product $(BH)_{max}=4.0$ m.g.o.

B

Ring-shaped magnet cores were made precisely as in Example I–A, except that a green magnet plate was pressed according to the arrangement shown in FIG. 1. As in Example I–A, the field strength was about 4000 oersted at the mid-point of the pressing space, but in this case the magnetic field lines in the cavity ran straight as shown in FIG. 1. The pressed, green rectangular magnet plate had the following dimensions: a thickness of 0.5 cm., a length of 10 cm. and a width of 9 cm. The ratio of the minimum lateral dimension to the thickness is 18. The electric power needed to obtain the magnetic field was 8200 watts. After fully sintering the plate at 1240° C., following the heating schedule of part A of this example, the fired plate had a thickness of 0.38 cm., a length of 9.1 cm. and a width of 8.1 cm. Ninety ring-shaped magnets each having an outside diameter of 0.72 cm., and an inside diameter of 0.36 cm., were cut out of the fired magnet plate by using an ultrasonic cutter with diamond abrasive.

Hysteresis loops were measured on twenty of the ninety ring-shaped magnets. The twenty samples were selected in order to give a true average of the magnetic properties of the magnet plate. The second quadrant of the hysteresis loop of the average sample is shown in FIG. 4. The remanence of the average sample was $B_r=4300$ gauss, the coercive force $_IH_c=2700$ oersted, and the maximum energy product $(BH)_{max}=4.5$ m.g.o. All the samples cut out of the rectangular plate had uniformly good properties within the error of measurement. However, it was noted that, upon repeating the experiment of this part B, when the thickness of the fired magnet plate was increased from 0.38 cm. to more than 1 cm., magnets cut out of the very edge and corner portions had, at the same level of coercive force, a remanence $B_r$ that was lower by 100 to 150 gauss than the remanence of the magnets cut out of that portion inside the plate within the area bounded by a line removed from the edges a distance equal to the thickness of the plate.

From comparison of the magnets of each of the above processes it is clear that substantially superior ferrite magnets are produced by the process of this invention as set forth in part B of the example.

It is further noted from a comparison of the above processes A and B that the electric power per ring-shaped magnet required for the orientation during the pressing is appreciably lower in process B. Only about 90 watts were needed per magnet in process B as compared to 480 watts in process A. This is of great importance when a large number of magnets are to be made.

EXAMPLE II

Ring-shaped magnets were made precisely as in Example I–B, except that the pressed green magnet plate was partially sintered by being heated to 900° C. at an average rate of about 120° C. per hour, kept at 900° C. for two hours, and then cooled to room temperature, and approximately ninety ring-shaped magnet cores were cut out of the semi-sintered plate with diamond edged cutting tools. Theerafter, the ring-shaped magnet cores were heated at an average rate of 165° C. per hour to 1240° C. and held at this temperature for 15 minutes. The average red ring-shaped magnet that was tested exhibited a remanence $B_r=4280$ gauss, a coercive force $_IH_c=2600$ oersted, and a maximum energy product $(BH)_{max}=4.5$ m.g.o.

EXAMPLE III

A

Single rectangular magnets were made using the composition and process described in Example I-A with the following exceptions: The pressed green magnets had a thickness of 1.6 cm., a length of 9 cm., and a width of 1.9 cm. The electric power needed for obtaining the required field of 4000 oersted was 9300 watts. The fired magnets had a thickness of 1.23 cm., a length of 8.1 cm. and a width of 1.72 cm. The aperage maynet exhibited a remanence $B_r=4210$ gauss, a coercive force $_IH_c=2150$ oersted and a maximum energy product $(BH)_{max}=4.05$ m.g.o.

The fired magnet bodies of this example were about 8.1 cm. long and were distorted along the length thereof. The distortion usually took the form of a smooth curve and could be measured as the deviation of the curve from a straight line or flat plane. If the straight line or flat plane is made tangent to the curved magnet at one extremity, the distance between the curved magnet and the line or plane at the other extremity is a measure of distortion. In the case of the individually pressed magnets of this example the average distortion of the magnets thus measured was approximately 0.3 cm.

B

Rectangular magnets were made using the composition and process described in Example I-B with the following exceptions: the pressed, rectangular green magnet plate had a thickness of 1.6 cm., a length of 10 cm. and a width of 9 cm. Five rectangular magnet cores were cut from the green pressed, magnet plate. Each of the five magnet cores had a thickness of 1.6 cm., a length of 9 cm. and a width of about 1.9 cm. The cut, green magnet cores were fired in the same manner as the magnets of part A, this example. The fired magnets had esentially the same dimensions as the fired magnets of part A, this example, but they were much less distorted.

The length of the fired magnets was thus about 8.1 cm., just as in part A of this example, but distortion of the magnets, measured as described above, averaged less than 0.05 cm.

The magnets exhibited the following average properties: a remanence $B_r=4290$ gauss, a coercive force $_IH_c=2650$ oersted, and a maximum energy product $(BH)_{max}=4.45$ m.g.o. It will be noted that the electric power per magnet required for the orientation during the pressing was only 1640 watts per magnet in the process of this example as compared with 9300 watts per magnet for the magnets of part A of this example.

EXAMPLE IV

A

Ring-shaped magnets were made precisely as in Example I-A with the exception that the starting mixture consisted of 17.5 weight percent of barium carbonate $BaCO_3$, 1.0 weight percent of lead oxide PbO, and 81.5 weight percent of iron oxide $Fe_2O_3$. The average magnet had a remanence $B_r=4060$ gauss, a coercive force $_IH_c=1600$ oersted, and a maximum energy product $(BH)_{max}=3.4$ m.g.o.

B

Ring-shaped magnets were made precisely as in Exaple I-B with the exception that the starting mixture consisted of 17.5 weight percent barium carbonate $BaCO_3$, 1.0 weight percent lead oxide PbO, and 81.5 weight percent iron oxide $Fe_2O_3$. The average magnet had a remanence $B_r=4150$ gauss, a coercive force $_IH_c=2010$ oersted, and a maximum energy product $(BH)_{max}=3.9$ m.g.o.

As these examples and FIG. 4 show, it is possible to manufacture magnets having exceptionally good characteristics with the very simple procedures encompassed by the invention. In addition, the electric power needed for the orientation of the magnets during the pressing operation is considerably lower in the process of the invention than in the standard process. Unlike the magnets made in the standard process, the magnets made using the process of the invention have greater uniformity of shape, less distortion and are generally crack-free.

One or more improved anisotropic magnets can be produced from a pressed plate of oriented ferrite material pressed in a magnetic field in accordance with the process described herein. In some cases only the edge portion to a depth corresponding to the thickness of the plate need be removed and the highly oriented central portion can be used in one piece or sub-divided into a plurality of pieces. After sintering and magnetizing superior magnets will be obtained from such central portion. Even the edge portions of such a ferrite plate, however, have usefully high magnetic properties.

Figure 5:
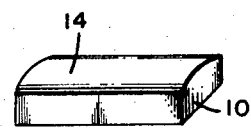
FIG. 5 illustrates an individual magnet plate which has been subjected to a coining operation.

It is possible to increase the density of the green ferrite plate by further compaction in a press. This will improve the magnetic properties without seriously affecting the orientation. Coining operations of this kind may also be carried out on the green ferrite plate to produce indentations in the face of the plate or to produce curved ferrite plates or plates with at least one curved surface. Reference is now directed to FIG. 5 of the drawings wherein one of the ferrite platelets is illustrated with one curve surface. More particularly, one of the individual platelets 10 of the subdivided green ferrite plate was subjected to a coining operation in a closed die. The coining operation produced the curved upper surface 14 which is illustrated in said FIG. 5.

While I have described my invention in connection with specific examples and specific embodiments, other modifications thereof will be readily apparent to those skilled in the art without departing from the spirit and scope of this invention as defined in the appended claims.

I claim as my invention:

1. In the method of making improved ferrite magnets, the steps comprising, pressing a slurry of finely divided ferrite material into a relatively flat body having its smallest lateral dimension at least five times the average thickness of the body, and concurrently subjecting the entire body to a strong magnetic field during the pressing, the magnetic field having its lines of force applied parallel to the pressing direction and substantially perpendicular to the face of the relatively flat body, thereby producing a green oriented ferrite body, subdividing the green ferrite body into a plurality of shapes generally corresponding to the desired magnets, sintering the individual shapes and thereafter magnetizing the resulting sintered shapes to provide the desired magnets.

2. In the method of making improved ferrite magnets, the steps comprising, pressing a slurry of finely divided ferrite material into a relatively flat body having its smallest lateral dimension at least five times the average thickness of the body, and concurrently subjecting the entire body to a strong magnetic field during the pressing, the magnetic field having its lines of force applied parallel to the pressing direction and substantially perpendicular to the face of the relatively flat body, thereby producing a green oriented ferrite body, firing the green ferrite body to a semi-sintered product, subdividing the semi-sintered product into a plurality of shapes generally corresponding to the desired magnets, fully sintering the individual shapes and thereafter magnetizing the resulting sintered shapes to provide the desired magnets.

3. In a method for making a plurality of anisotropic permanent ferrite magnets the steps comprising pressing a slurry of a ferrite powder in a magnetic field to form a green oriented ferrite plate in which the ferrite powder particles are magnetically oriented parallel to the pressing direction, the ferrite plate having its major dimensions in a plane perpendicular to the pressing direction and its thickness parallel to the pressing direction, the smallest major dimension of said ferrite plate being at least five times the thickness of said plate, subdividing the green ferrite plate into a predetermined number of ferrite bodies, sintering and thereafter magnetizing the ferrite bodies to produce magnets.

4. The method of claim 3 in which the green ferrite plate is fired to produce a semi-sintered product and thereafter is subdivided into the predetermined number of ferrite bodies prior to final sintering and magnetization.

5. The method of claim 3 in which the green ferrite plate is fired to produce a fully sintered product and is thereafter subdivided into the predetermined number of ferrite bodies prior to magnetization.

6. In a method for making a plurality of anisotropic permanent ferrite magnets the steps comprising pressing a ferrite slurry in a magnetic field to form a green oriented ferrite plate in which the ferrite particles are magnetically oriented parallel to the pressing direction, the ferrite plate having its principal surfaces in planes perpendicular to the pressing direction and its thickness parallel to the pressing direction, the major dimensions of said ferrite plate being at least 10 times the thickness of said plate, cutting the green ferrite into the desired number of ferrite bodies, sintering and thereafter magnetizing the ferrite bodies.

7. The method of claim 6 wherein the green ferrite plate is subjected to a coining operation to produce predetermined indentations in at least one surface thereof.

8. The method of claim 6 wherein the green ferrite plate is subjected to compaction in a press to increase the density of the plate and thereby improve the magnetic properties thereof.

9. The method of claim 6 wherein the green ferrite plate is subjected to a coining operation to impart subtantial curvature to at least one principal surface thereof.

10. The method of claim 6 in which the green ferrite plate is first fired at a temperature from about 800° C. to about 1000° C. to produce a semi-sintered product and is thereafter cut into the desired number of ferrite bodies.

11. The method of claim 6 in which the green ferrite plate is first fired to produce a fully sintered product and is thereafter cut into the desired number of ferrite bodies.

12. The method of claim 6 wherein the green ferrite plate is subjected to a coining operation to impart substantial curvature to at least one principal surface thereof, then fired to produce a semi-sintered product, and thereafter is subdivided into the desired number of ferrite bodies.

13. The method of claim 6 in which the pressed surface of the ferrite plate is rectangular in shape.

14. In a method for making a plurality of anisotropic permanent ferrite magnets, the steps comprising pressing a ferrite slurry while it is subjected to a strong magnetic field to form a green oriented ferrite plate, said magnetic field having a cross sectional area in a plane perpendicular to the magnetic lines of force which is at least co-extensive with a parallel cross sectional area of said ferrite plate, the smallest dimension of said cross sectional areas being at least five times the thickness of said ferrite plate, subdividing the green ferrite plate into the desired number of magnets, sintering and thereafter magnetizing the magnets.

15. The method of claim 14 in which the green ferrite plate is fired to produce a semi-sintered product and thereafter cutting the semi-fired plate into the desired number of ferrite bodies.

16. The method of claim 14 in which the green ferrite plate is fired to produce a fully sintered product and thereafter cutting the sintered plate into the desired number of ferrite bodies.

17. In a method for making an anisotropic permanent ferrite magnet having an improved energy product and free from cracks and warpage, the steps comprising pressing a ferrite slurry to form a green oriented ferrite plate, imposing a magnetic field upon said ferrite plate to orient the particles thereof, said magnetic field having a cross sectional area in a plane perpendicular to the magnetic lines of force which is at least co-extensive with the surface of said ferrite plate, the smallest dimension of said cross sectional areas being at least five times the thickness of said ferrite plate, removing from the entire periphery of said ferrite plate a region thereof having a width substantially equal to the thickness of said plate, sintering and thereafter magnetizing the plate.

18. The method of claim 17 in which the green ferrite plate is subjected to a coining operation to produce at least one curved plate surface.

References Cited
UNITED STATES PATENTS

| | | | |
|---|---|---|---|
| 2,961,709 | 11/1960 | Eichbaum et al. | 29—155.6 X |
| 3,085,291 | 4/1963 | Haes et al. | |
| 3,110,675 | 11/1963 | Brailowsky | 29—155.59 X |
| 3,127,544 | 3/1964 | Blume | 317—203 |
| 3,163,922 | 1/1965 | Brailowsky | 29—155.6 |

JOHN F. CAMPBELL, *Primary Examiner.*